United States Patent
Klassen et al.

(10) Patent No.: US 7,764,277 B2
(45) Date of Patent: Jul. 27, 2010

(54) SYSTEM AND METHOD FOR USER INTERFACE GENERATION

(75) Inventors: Gerhard D. Klassen, Waterloo (CA); Matthew Bells, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1113 days.

(21) Appl. No.: 11/155,946

(22) Filed: Jun. 17, 2005

(65) Prior Publication Data

US 2006/0001678 A1   Jan. 5, 2006

Related U.S. Application Data

(60) Provisional application No. 60/581,287, filed on Jun. 18, 2004.

(51) Int. Cl.
*G06F 3/038* (2006.01)
(52) U.S. Cl. ............... 345/204; 345/650; 715/700; 715/778
(58) Field of Classification Search ........... 345/169, 345/204; 705/27; 715/700, 75, 778, 804, 715/805
See application file for complete search history.

(56) References Cited

U.S. PATENT DOCUMENTS

| 6,556,210 B1 | 4/2003 | Yamamoto et al. |
| 7,487,462 B2 * | 2/2009 | Good et al. .......... 715/778 |
| 2003/0065590 A1 | 4/2003 | Haeberli |
| 2004/0056894 A1 | 3/2004 | Zaika et al. |
| 2004/0109197 A1 | 6/2004 | Gardaz et al. |
| 2004/0252074 A1 * | 12/2004 | Schaper .............. 345/1.1 |
| 2005/0057485 A1 * | 3/2005 | Diefenbaugh ......... 345/102 |

FOREIGN PATENT DOCUMENTS

EP   1 098 246 A1   5/2001

OTHER PUBLICATIONS

International Search Report of Application No. PCT/CA2005/000940, date of mailing Sep. 26, 2005—15 pgs.
International Preliminary Report on Patentability of Application No. PCT/CA2005/000940, date of mailing Oct. 6, 2006—11 pgs.
EPO: Supplementary European Search Report mailed Feb. 26, 2008, European Patent Application No. 05759152.1-1243.
Bos, B.: "Re: CSS: Extended tiling. Proposal" [Online] May 5, 2004, pp. 1-2, www-style@w3.org, http://lists.w3.org/Archives/Public/www-style/2004May/0020.html.
W3C: "CSS3 Module: Border" [Online] Nov. 7, 2002, pp. 1-14, http://www.w3.org/TR/2002/WD-css3-border-20021107/.
W3C: "CSS3 Backgrounds and Borders Module" [Online] Feb. 16, 2005, pp. 1-29, http://www.w3.org/TR/2005/WD-css3-background-20050216/.

* cited by examiner

*Primary Examiner*—Kimnhung Nguyen
(74) *Attorney, Agent, or Firm*—Jones Day; Krishna K. Pathiyal; Robert C. Liang (57) ABSTRACT

Systems and methods for use in displaying user interface components upon user interfaces of computing devices. A system and method could be configured to receive an image to be displayed upon a user interface of the device. One or more indicators can be used to specify how the image is to be divided into multiple regions. The regions of the divided image are displayed with a user interface component upon the user interface of the device.

22 Claims, 10 Drawing Sheets

SYSTEM AND METHOD FOR USER INTERFACE GENERATION

RELATED APPLICATION

This application claims priority to and the benefit of U.S. Provisional Application Ser. No. 60/581,287, filed on Jun. 18, 2004, of which the entire disclosure (including any and all figures) of the application is incorporated herein by reference.

BACKGROUND

1. Technical Field

This patent document relates generally to the field of communications, and in particular to generating user interfaces on mobile wireless communications devices.

2. Description of the Related Art

Borders around user interface components (e.g., buttons, windows, menus) are typically drawn by delegating the task to a piece of code. When a user interface graphic designer wishes to change the look of a user interface in more than in a minor way, then this code usually has to change.

Additional problems arise if a designer is to use an image (e.g., bitmap, vector image, etc.) of the user interface's border. As one illustration, a bitmap cannot simply be scaled to fit the varying dimensions as this may distort it, thereby resulting in "pixelation" problem (e.g., distortion may have the effect that larger user interface components have thicker borders).

DESCRIPTION

Figure 1:
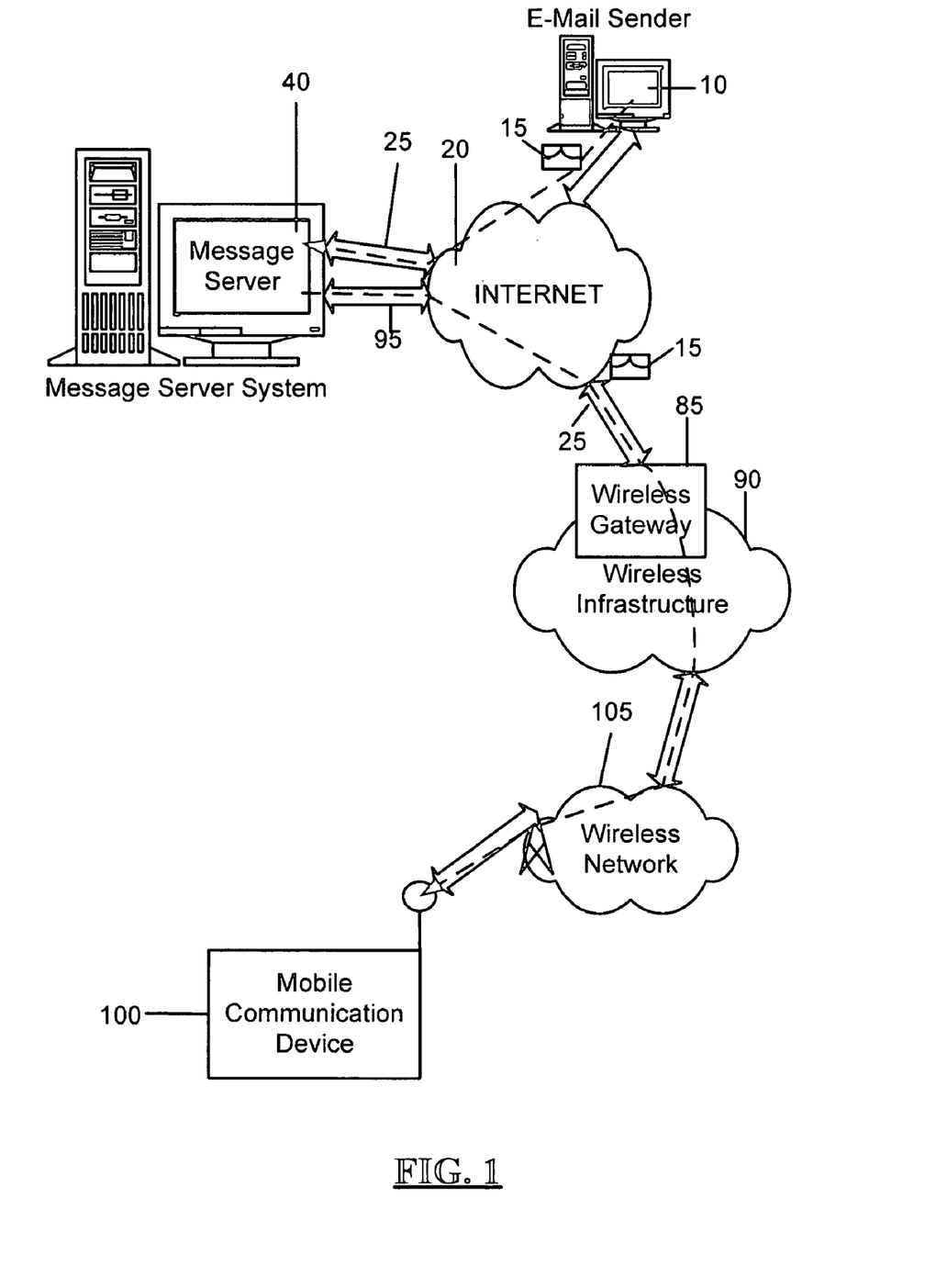
FIG. 1 is a block diagram depicting an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
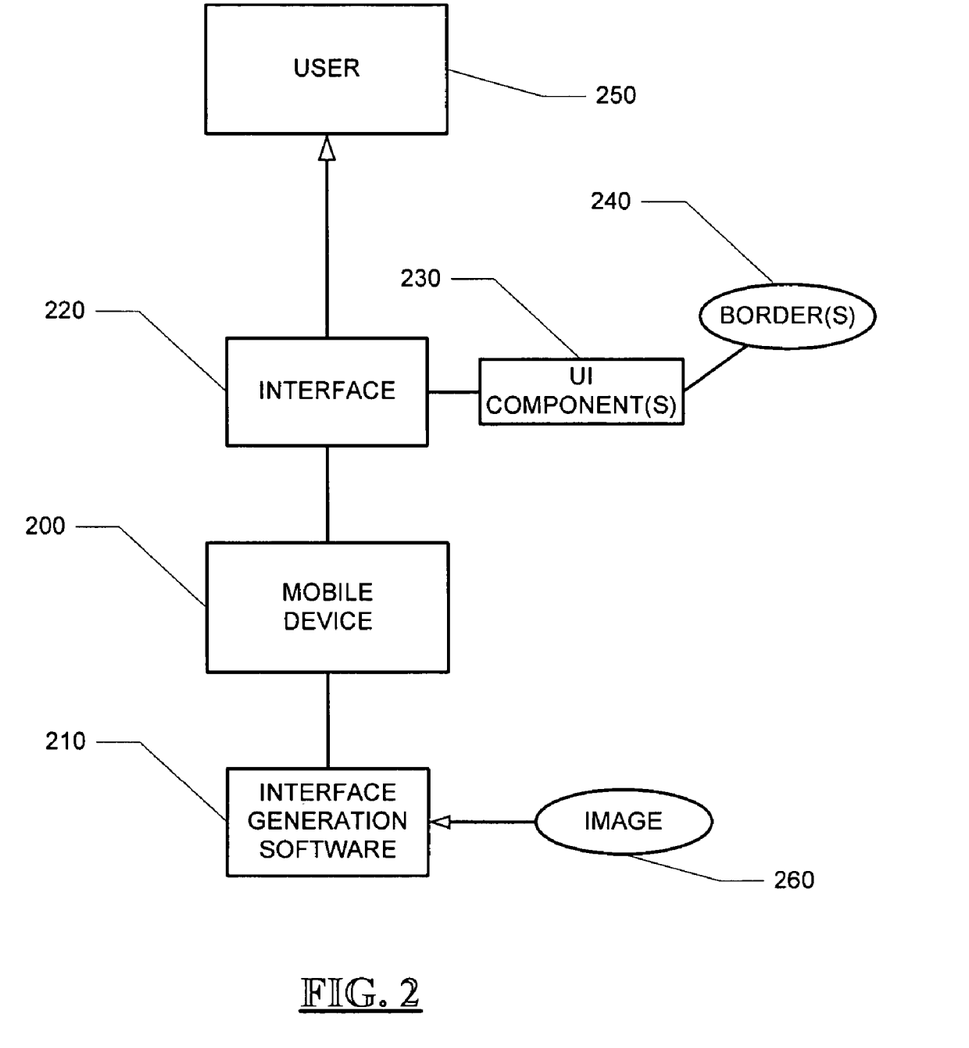
FIG. 2 is a block diagram depicting a system that provides displays to a user.

FIG. 2 shows a system that utilizes an image 260, such as a scalable image, and several indicators to specify how a user interface border 240 should look when it is displayed to a user 250 of a mobile device 200. The mobile device 200 can use many different ways to perform this. For example, the device 200 could contain interface generation software 210 which can utilize the image 260 (e.g., a bitmap, etc.) and several integer parameters to specify how a user interface border 240 for a user interface component 230 should look.

The interface generation software 210 can be configured to receive an image 260 for display upon the user interface 220. A plurality of parameters (e.g., indicators) can be used to specify how the image 260 is to be divided into multiple regions. The parameters can specify distances from an edge (or other predetermined location) of the image 260 to a predetermined division line associated with the image 260. The regions of the divided image are displayed with a user interface component 230 (e.g., buttons, windows, menus) upon the device's user interface 220.

This provides, among other things, greater control to a graphic designer without the need to write code. This also provides a graphic designer with an efficient approach to create stylized user interfaces in a relatively brief amount of time, thus making it easier to create brand differentiation for the user interfaces.

As another example, a system can include using one or more integer parameters to divide an image into multiple regions. For example, the values can specify distances from an edge to an imaginary division line. The values can be specified for the: top, right, bottom, and left.

Figure 3:
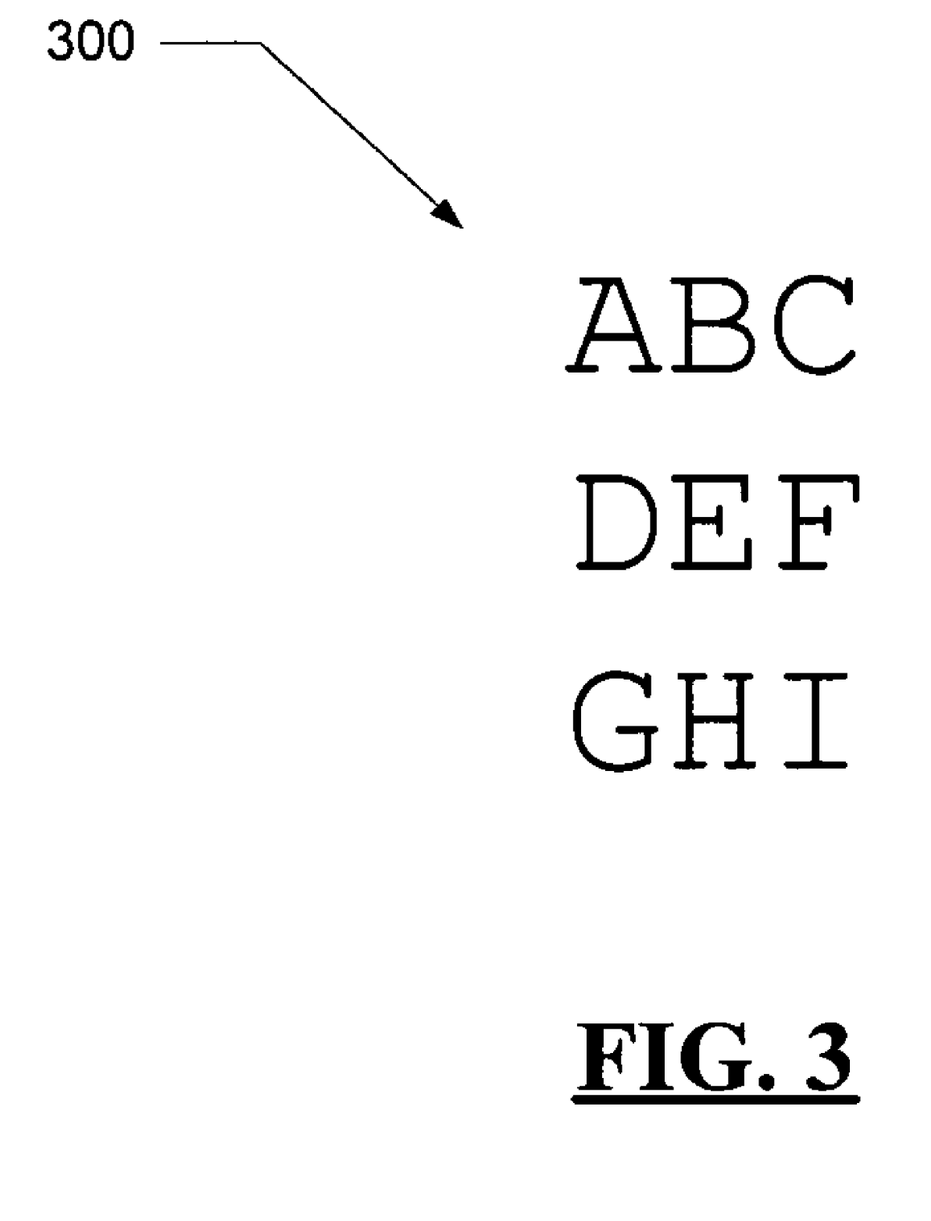
FIG. 3 shows image partitioning into regions for use in a user interface.

As an illustration, let the image regions be labeled "A"-"I" as shown at 300 in FIG. 3. Regions A, C, G, and I are painted in the corners of the user interface component. Regions B, F, H, and D are tiled along the edges. Region E is tiled throughout the center.

It should be understood that many different approaches can be used to specify the user interface border, such as x, y, width, and height values for the center square, with the values being other than integers. The regions also need not be rectangular or square shaped, but may assume other shapes to fit the application at hand.

As another example, suppose a graphic designer wants a border 2 points wide, no matter the resolution it is at. The image can be divided into nine areas and possibly rendered to a bitmap. The border specification parameters could also be scaled to pixels, so if 1 pixel=0.5 point then (2, 3, 2, 3) in point would become (4, 6, 4, 6) in pixel and on a display where 1 pixel=0.33 point then it will be (6, 9, 6, 9). Note: 1 point=254/720000 m.

Figure 4:
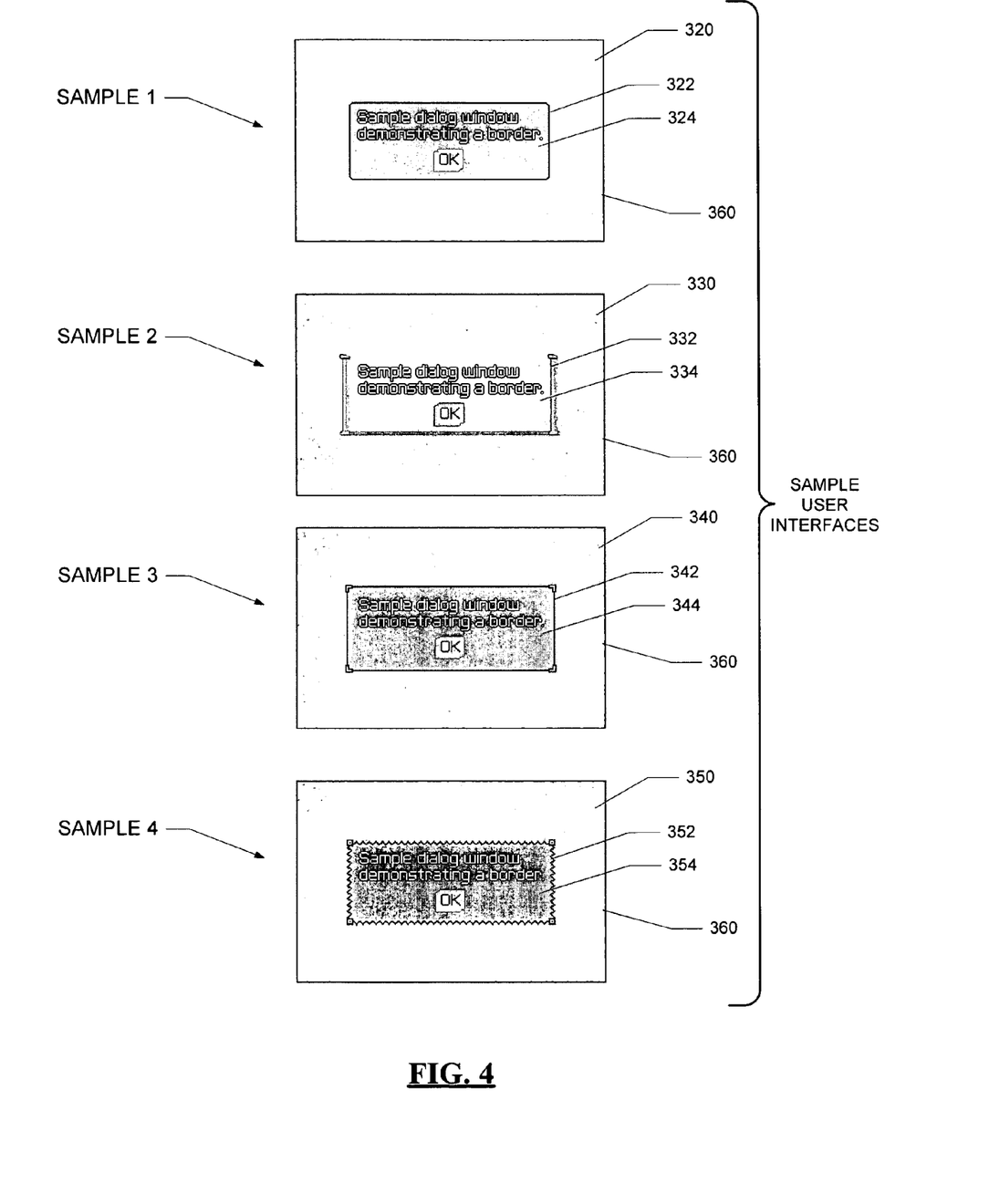
FIG. 4 depicts example user interfaces.

FIG. 4 depicts several example samples of user interface components that have been provided with borders. In the first sample of FIG. 4, user interface 320 contains a user interface component 324 that has text and a button that can be activated by a user. User interface component 324 has been provided with border 322. In the second sample, user interface 330 contains a user interface component 334 that has text and a button that can be activated by a user. User interface component 334 has been provided with border 332. In the third sample, user interface 340 contains a user interface component 344 that has text and a button that can be activated by a user. User interface component 344 has been provided with border 342. In the fourth sample, user interface 350 contains a user interface component 354 that has text and a button that can be activated by a user. User interface component 354 has been provided with border 352. Region 360 for the different samples is the ambient background behind the window.

Figure 5:
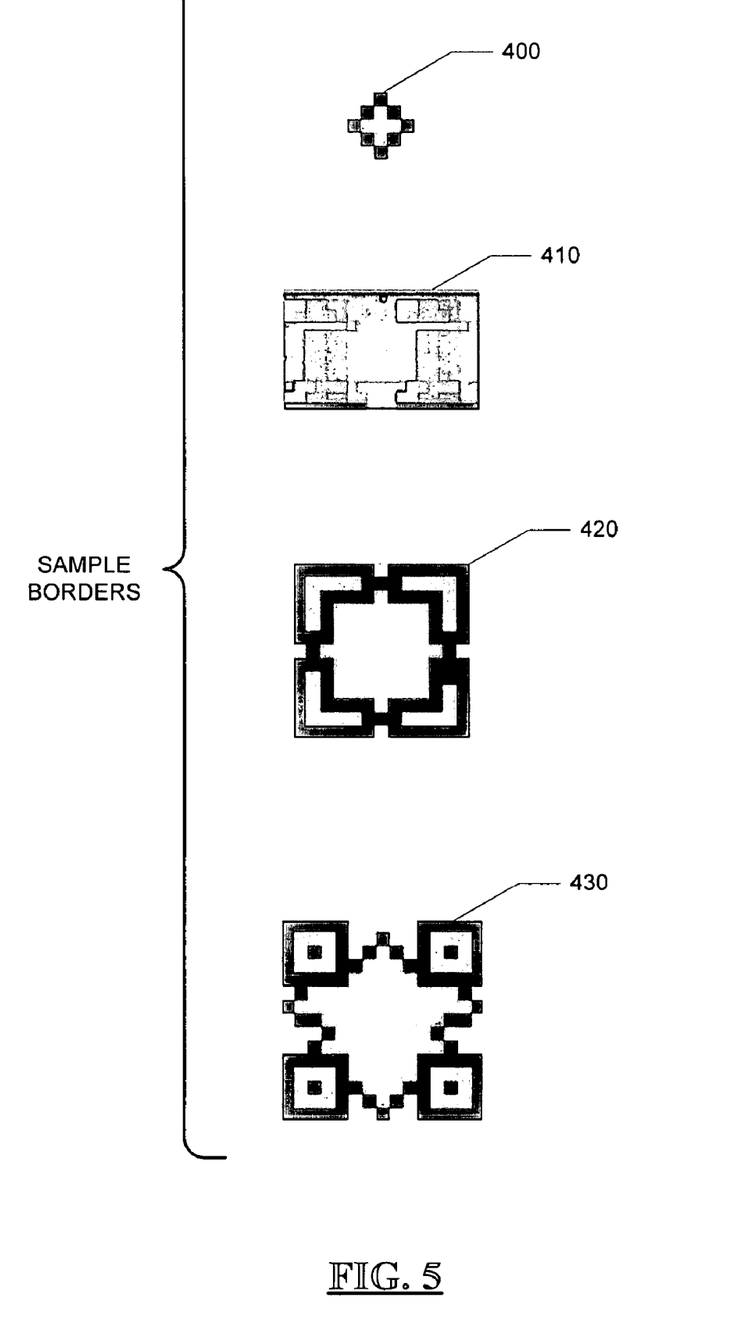
FIG. 5 depicts example border components.
Figure 6:
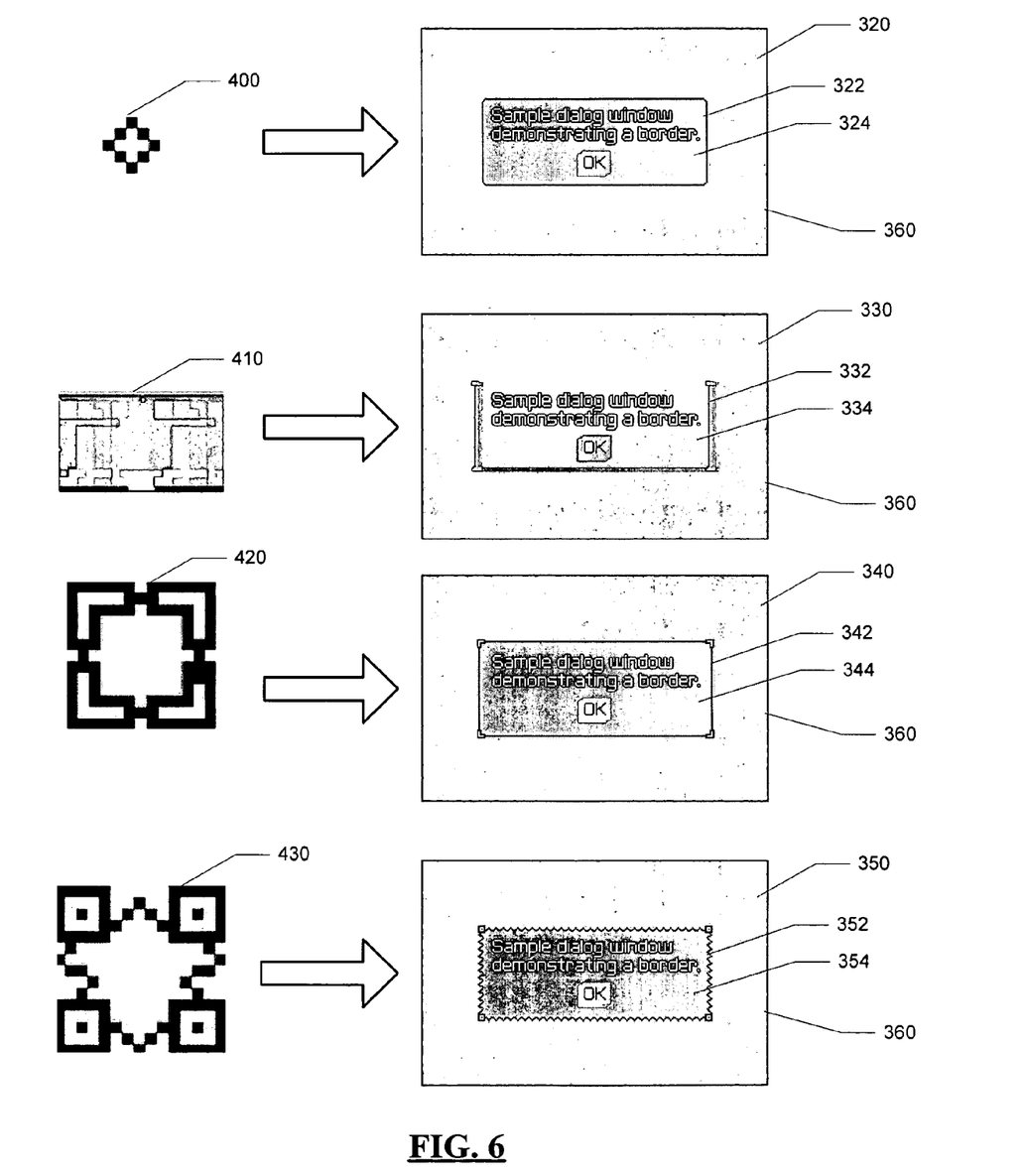
FIG. 6 depicts use of example border components for use with user interfaces.

FIG. 5 depicts the different border components that were used for each of the sample user interfaces of FIG. 4. FIG. 6 more specifically shows that border component 400 was used as the border 322 with user interface 320. Border component 410 was used as the border 332 with user interface 330. Border component 420 was used as the border 342 with user interface 340. Border component 430 was used as the border 352 with user interface 350.

The border definitions for each of the samples were expressed in the following code/software instructions:

<borderdef name="sample1" top="2" right="2" bottom="2" left="2"/>

<borderdef name="sample2" top="3" right="9" bottom="3" left="9"/>

<borderdef name="sample3" top="6" right="6" bottom="6" left="6"/>

<borderdef name="sample4" top="5" right="5" bottom="5" left="5"/>

Accordingly for the user interface sample 1 (shown at 320 on FIG. 6), the border was defined such that the image 400 is to be divided using a top parameter value of 2, a right parameter value of 2, a bottom parameter value of 2, and a left parameter value of 2.

For the user interface sample 2 (shown at 330 on FIG. 6), the border was defined such that the image 410 is to be divided using a top parameter value of 3, a right parameter value of 9, a bottom parameter value of 3, and a left parameter value of 9.

For the user interface sample 3 (shown at 340 on FIG. 6), the border was defined such that the image 420 is to be divided using a top parameter value of 6, a right parameter value of 6, a bottom parameter value of 6, and a left parameter value of 6.

For the user interface sample 4 (shown at 350 on FIG. 6), the border was defined such that the image 430 is to be divided using a top parameter value of 5, a right parameter value of 5, a bottom parameter value of 5, and a left parameter value of 5.

Figure 7:
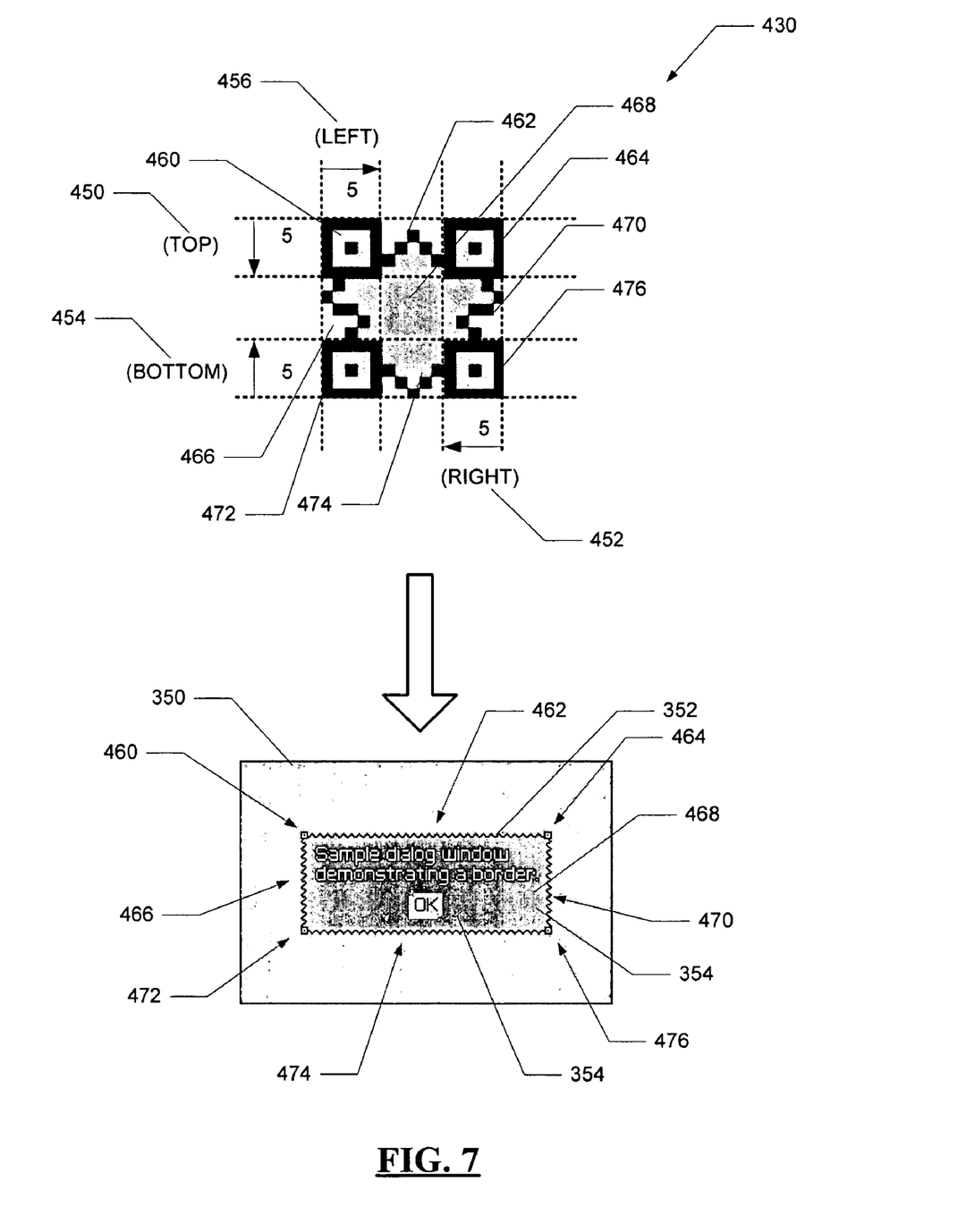
FIG. 7 depicts an example of an image being divided for use in a user interface.

FIG. 7 depicts an example of one of the images being divided for use in a user interface. With reference to FIG. 7, image 430 is partitioned for use with user interface 350 with the following integer parameters:

<borderdef name="sample4" top="5" right="5" bottom="5" left="5"/>

The border was defined such that the image 430 is to be divided using a top parameter value of 5 as shown at 450, a right parameter value of 5 as shown at 452, a bottom parameter value of 5 as shown at 454, and a left parameter value of 5 as shown at 456. The partitioning through these parameters resulted in nine regions for image 430: region 460, region 462, region 464, region 466, region 468, region 470, region 472, region 474, and region 476.

Divided corner image regions 460, 464, 472, and 476 were painted in the corners of the user interface component 352. Divided image regions 462, 466, 470, and 474 were tiled along the edges of the user interface component 352. Divided image region 468 was tiled throughout the center of the user interface component 352.

Figure 8:
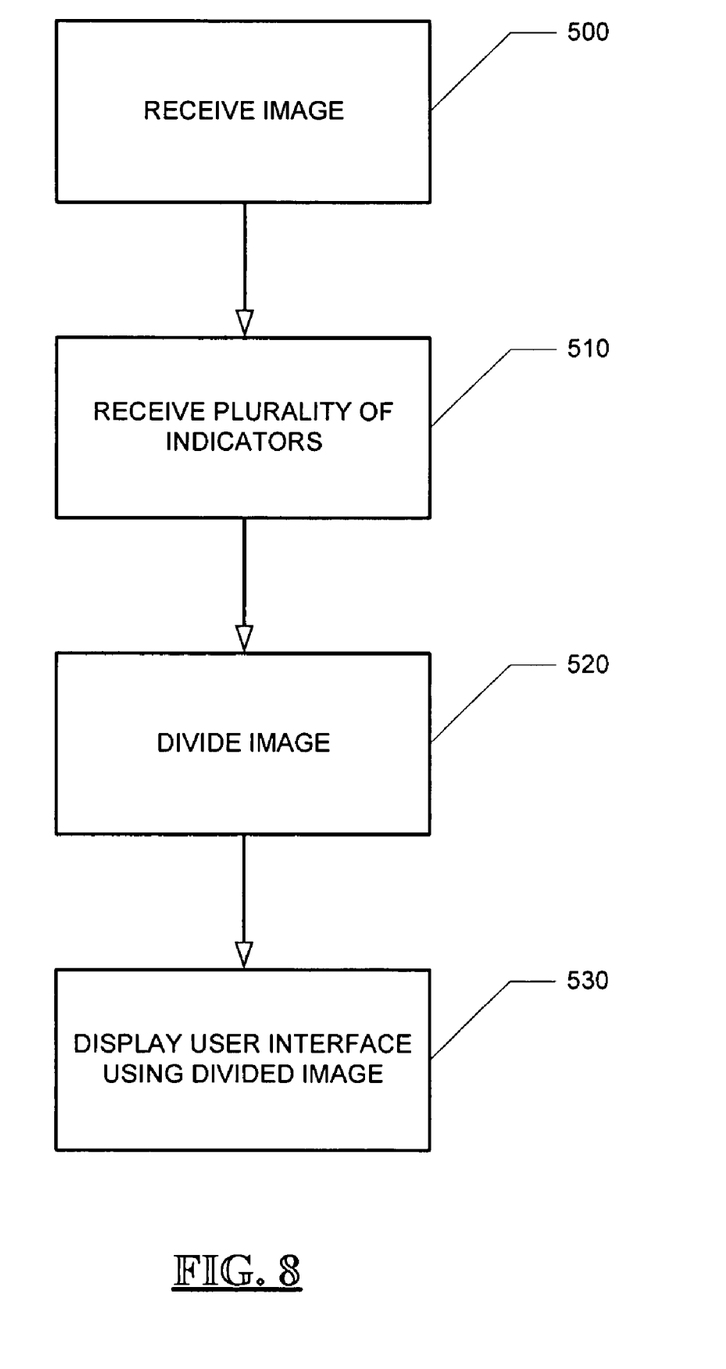
FIG. 8 is a flow chart depicting an operational scenario for generating user interfaces.

FIG. 8 depicts an operational scenario for generating user interfaces. At process block 500, a computing device receives an image. At process block 510, a plurality of indicators are received for use in dividing (e.g., partitioning) an image into sub-regions at process block 520. At process block 530, a user interface is displayed using the sub-regions.

Figure 9:
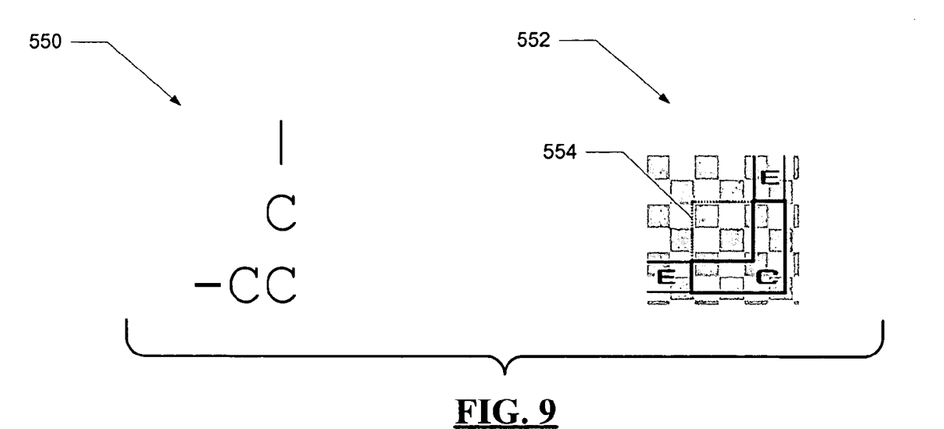
FIG. 9 depicts example wherein additional specifications can be added for use in a user interface.

It should be understood that similar to the other processing flows described herein, the steps and the order of the steps in the flowchart described herein may be altered, modified and/or augmented and still achieve the desired outcome. As an illustration, a system can be configured using one or more of the features disclosed herein to change more than the color of a border without writing or modifying program code to change the shape. As another illustration, FIG. 9 provides an example wherein a second rectangle specification can be added. As shown at 550 in FIG. 9, "C" represents a corner, blank represents an interior, and '-' and '|' represent edges. The example of FIG. 9 illustrates corners being allowed to extend into the main region, and/or one corner being allowed to be a different size than an adjacent corner. This is graphically shown at 552 of FIG. 9. As shown at 552, a piece 554 of the corner that overlaps the main window rectangle can be made transparent; this modification allows the corner to specify the edge beyond the adjacent edge.

Figure 10:
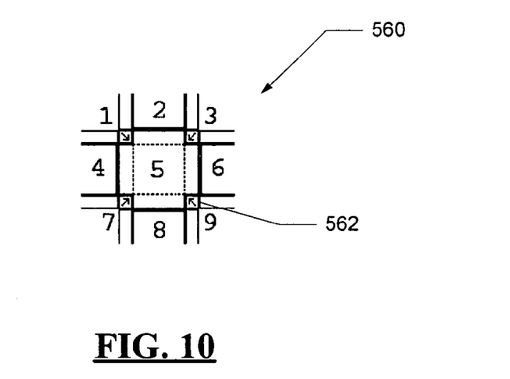
FIG. 10 depicts an example wherein a second specification can be added to make one or more additional regions.

This is further illustrated at 560 in FIG. 10. With reference to FIG. 10, a second rectangle may be added to make area 5 non-rectangular. Areas 1, 3, 7, 9 are copied, and areas 2, 4, 6, 8 are smaller, yet tiled as mentioned above. The window content is then drawn in area 5' which is defined by the bolder rectangle 562.

The systems and methods disclosed herein are presented only by way of example and are not meant to limit the scope of the invention. Other variations of the systems and methods described above will be apparent to those skilled in the art and as such are considered to be within the scope of the invention. For example, systems and methods can be configured so as to assist graphic designers for handheld devices since typically only one screen resolution is used on a handheld device, thereby needing only one bitmap. Such a user interface may allow that all or nearly all elements can follow a rectangle model for layout. Also, systems and methods can be used with any scalable image, and scaled to the device resolution and then segmented.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein. Non-limiting examples of systems and methods include the following. A system and method could be configured to receive an image to be displayed upon a user interface of the device. One or more indicators can be used to specify how the image is to be divided into multiple regions. The regions of the divided image are displayed with a user interface component upon the user interface of the device.

As another example, a system and method can include a mobile device that is configured to display one or more user interface components to a user. The mobile device can contain a storage device to store an image for display upon a user interface of the device. Interface generation instructions are configured to use a plurality of parameters to specify how the image is to be divided into multiple regions. The parameters specify distances from an edge of the image to a predetermined division line associated with the image. The regions of the divided image are displayed with a user interface component upon the user interface of the device.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Figure 11:
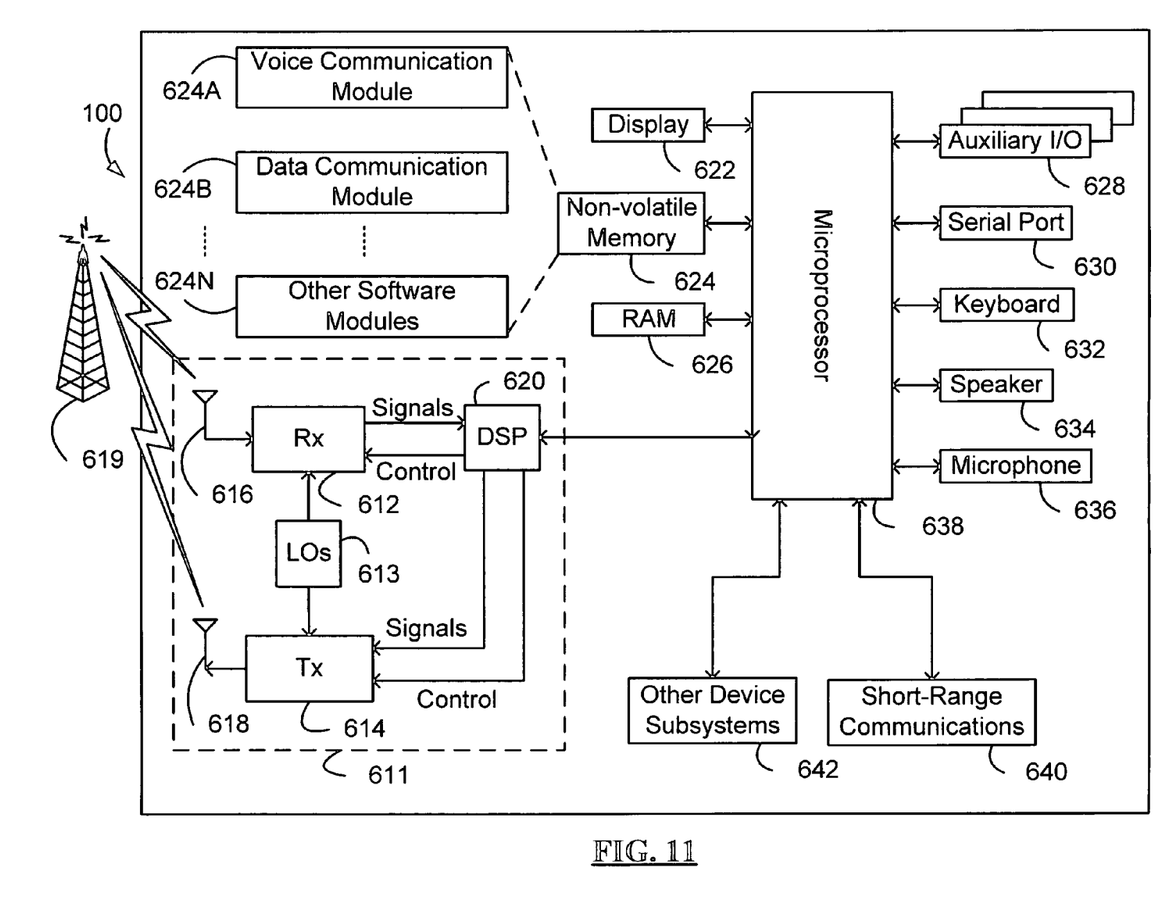
FIG. 11 is a block diagram depicting an example mobile wireless communication device.

As another example of the wide scope of the systems and methods disclosed herein, the systems and methods disclosed herein may be used with many different computers (e.g., home desktop computers) and devices, such as a wireless mobile communications device shown in FIG. 11. With reference to FIG. 11, the mobile device 100 is a dual-mode mobile device and includes a transceiver 611, a microprocessor 638, a display 622, non-volatile memory 624, random access memory (RAM) 626, one or more auxiliary input/output (I/O) devices 628, a serial port 630, a keyboard 632, a speaker 634, a microphone 636, a short-range wireless communications sub-system 640, and other device sub-systems 642.

The transceiver 611 includes a receiver 612, a transmitter 614, antennas 616 and 618, one or more local oscillators 613, and a digital signal processor (DSP) 620. The antennas 616 and 618 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 11 by the communication tower 619. These voice and data networks may be separate communication networks using separate infrastructure, such as base stations, network controllers, etc., or they may be integrated into a single wireless network.

The transceiver 611 is used to communicate with the network 619, and includes the receiver 612, the transmitter 614, the one or more local oscillators 613 and the DSP 620. The DSP 620 is used to send and receive signals to and from the transceivers 616 and 618, and also provides control information to the receiver 612 and the transmitter 614. If the voice and data communications occur at a single frequency, or closely-spaced sets of frequencies, then a single local oscillator 613 may be used in conjunction with the receiver 612 and the transmitter 614. Alternatively, if different frequencies are utilized for voice communications versus data communications for example, then a plurality of local oscillators 613 can be used to generate a plurality of frequencies corresponding to the voice and data networks 619. Information, which includes both voice and data information, is communicated to and from the transceiver 611 via a link between the DSP 620 and the microprocessor 638.

The detailed design of the transceiver 611, such as frequency band, component selection, power level, etc., will be dependent upon the communication network 619 in which the mobile device 100 is intended to operate. For example, a mobile device 100 intended to operate in a North American market may include a transceiver 611 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 619, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 619, other than any legally required operations, such as '911' emergency calling.

After any required network registration or activation procedures have been completed, the mobile device 100 may the send and receive communication signals, including both voice and data signals, over the networks 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618.

In addition to processing the communication signals, the DSP 620 also provides for transceiver control. For example, the gain levels applied to communication signals in the receiver 612 and the transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 100. Many types of microprocessors or microcontrollers could be used here, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A may provide a high-level user interface operable to transmit and receive voice calls between the mobile device 100 and a plurality of other voice or dual-mode devices via the network 619. Similarly, the data communication module 624B may provide a high-level user interface operable for sending and receiving data, such as e-mail messages, files, organizer information, short text messages, etc., between the mobile device 100 and a plurality of other data devices via the networks 619.

The microprocessor 638 also interacts with other device subsystems, such as the display 622, the RAM 626, the auxiliary input/output (I/O) subsystems 628, the serial port 630, the keyboard 632, the speaker 634, the microphone 636, the short-range communications subsystem 640 and any other device subsystems generally designated as 642.

Some of the subsystems shown in FIG. 11 perform communication-related functions, whereas other subsystems may provide "resident" or on-device functions. Notably, some subsystems, such as the keyboard 632 and the display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as non-volatile memory 624. The non-volatile memory 624 may be implemented, for example, as a Flash memory component, or as battery backed-up RAM. In addition to the operating system, which controls low-level functions of the mobile device 610, the non-volatile memory 624 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions. These modules are executed by the microprocessor 638 and provide a high-level interface between a user and the mobile device 100. This interface typically includes a graphical component provided through the display 622, and an input/output component provided through the auxiliary I/O 628, keyboard 632, speaker 634, and microphone 636. The operating system, specific device applications or modules, or parts thereof, may be temporarily loaded into a volatile store, such as RAM 626 for faster operation. Moreover, received communication signals may also be temporarily stored to RAM 626, before permanently writing them to a file system located in a persistent store such as the Flash memory 624.

An exemplary application module 624N that may be loaded onto the mobile device 100 is a personal information manager (PIM) application providing PDA functionality, such as calendar events, appointments, and task items. This module 624N may also interact with the voice communication module 624A for managing phone calls, voice mails, etc., and may also interact with the data communication module for managing e-mail communications and other data transmissions. Alternatively, all of the functionality of the voice communication module 624A and the data communication module 624B may be integrated into the PIM module.

The non-volatile memory 624 preferably also provides a file system to facilitate storage of PIM data items on the device. The PIM application preferably includes the ability to send and receive data items, either by itself, or in conjunction with the voice and data communication modules 624A, 624B, via the wireless networks 619. The PIM data items are preferably seamlessly integrated, synchronized and updated, via the wireless networks 619, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 626. Such information may instead be stored in the non-volatile memory 624, for example, when storage intervals are relatively short, such that the information is removed from memory soon after it is stored. However, storage of this information in the RAM 626 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 630 of the mobile device 100 to the serial port of a computer system or device. The serial port 630 may also be used to enable a user to set preferences through an external device or software application, or to download other application modules 624N for installation. This wired download path may be used to load an encryption key onto the device, which is a more secure method than exchanging encryption information via the wireless network 619. Interfaces for other wired download paths may be provided in the mobile device 100, in addition to or instead of the serial port 630. For example, a USB port would provide an interface to a similarly equipped personal computer.

Additional application modules 624N may be loaded onto the mobile device 100 through the networks 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 611 and provided to the microprocessor 638, which preferably further processes the received signal in multiple stages as described above, for eventual output to the display 622, or, alternatively, to an auxiliary I/O device 628. A user of mobile device 100 may also compose data items, such as e-mail messages, using the keyboard 632, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 628, which may include a thumbwheel input device, a touchpad, a variety of switches, a rocker input switch, etc. The composed data items input by the user may then be transmitted over the communication networks 619 via the transceiver module 611.

When the mobile device 100 is operating in a voice communication mode, the overall operation of the mobile device is substantially similar to the data mode, except that received signals are preferably be output to the speaker 634 and voice signals for transmission are generated by a microphone 636. Alternative voice or audio I/O subsystems, such as a voice message recording subsystem, may also be implemented on the mobile device 100. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module and the operating system software, may detect the caller identification information of an incoming voice call and display it on the display 622.

A short-range communications subsystem 640 is also included in the mobile device 100. The subsystem 640 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

It is claimed:

1. A method for use in displaying a user interface component upon a user interface of a computing device, comprising:
   receiving an image to be displayed upon a user interface of the device;
   using a plurality of parameters to specify how the image is to be divided into multiple regions;
   wherein the parameters specify distances from an edge of the image to a predetermined division line associated with the image;
   wherein one or more additional parameters are used to further divide the image into additional sub-regions;
   wherein the additional sub-regions include: a corner, associated with the image, that extends into a main associated with the image; a corner, associated with the image, that is a different size than an adjacent corner; or combinations thereof; and
   displaying the regions of the divided image with a user interface component upon the user interface of the device;
   wherein a plurality of the regions of the divided image are used as part of a border around the user interface component.

2. The method of claim 1, wherein the user interface component is a menu, a window, or a button.

3. The method of claim 1, wherein the image is a scaleable or vector image.

4. The method of claim 1, wherein the image is a bitmap image.

5. The method of claim 1, wherein the parameters are integer parameters that are used in dividing the image into the multiple regions.

6. The method of claim 1, wherein the distances are specified for the top, right, bottom, and left distances.

7. The method of claim 6, wherein a plurality of the divided regions are painted in the corners of the user interface component.

8. The method of claim 7, wherein a plurality of the divided regions are tiled along the edges of the user interface component.

9. The method of claim 7, wherein at least one of the divided regions is tiled throughout the center of the user interface component.

10. The method of claim 1, wherein the divided regions are used within a shape that is in the form of a rectangle.

11. The method of claim 1, wherein the divided regions are used within a shape that is not in the form of a rectangle.

12. The method of claim 1, wherein said using of the parameters to specify how the image is to be divided reduces at least substantially a pixelation problem.

13. The method of claim 1, wherein the computing device is a wireless mobile communications device; wherein the wireless mobile communications device uses only one screen resolution, thereby requiring only one bitmap.

14. The method of claim 13, wherein the wireless mobile communications device is used to send and receive e-mail messages.

15. The method of claim 1, wherein the computing device is a handheld device; wherein the handheld device uses only one screen resolution, thereby requiring only one bitmap.

16. Computer-readable medium capable of causing the computing device to perform the method of claim 1.

17. The method of claim 1, wherein exactly eight regions of the divided image are used as part of the border around the user interface component.

18. The method of claim 1, wherein four of the regions of the divided image are each tiled as part of the border around the user interface component.

19. The method of claim 1, wherein a plurality of the regions of the divided image are used as part of the border around the outside of the user interface component such that no portion of the user interface component extends beyond the displayed regions of the divided image.

20. The method of claim 1, wherein a plurality of the regions of the divided image are used as part of the border around the user interface object such that the regions of the divided image completely surround the user interface object.

21. A mobile device configured to display one or more user interface components to a user, comprising:

a storage device to store an image for display upon a user interface of the device; and interface generation instructions configured to use a plurality of parameters to specify how the image is to be divided into multiple regions;

wherein the parameters specify distances from an edge of the image to a predetermined division line associated with the image;

wherein one or more additional parameters are used to further divide the image into additional sub-regions;

wherein the additional sub-regions include: a corner, associated with the image, that extends into a main region associated with the image; a corner, associated with the image, that is a different size than an adjacent corner; or combinations thereof; and wherein the regions of the divided image are displayed with a user interface component upon the user interface of the device;

wherein a plurality of the regions of the divided image are used as part of a border around the user interface component.

22. A system for use in displaying one or more user interface components to a user of a computing device, comprising:

means for receiving an image to be displayed upon a user interface of the computing device;

means for using a plurality of parameters to specify how the image is to be divided into multiple regions;

wherein the parameters specify distances from an edge of the image to a predetermined division line associated with the image;

wherein one or more additional parameters are used to further divide the image into additional sub-regions;

wherein the additional sub-regions include: a corner, associated with the image, that extends into a main region associated with the image; a corner, associated with the image, that is a different size than an adjacent corner; or combinations thereof; and means for displaying the regions of the divided image with a user interface component upon the user interface of the device;

wherein a plurality of the regions of the divided image are used as part of a border around the user interface component.

* * * * *